US006490996B1

(12) United States Patent
Terry

(10) Patent No.: US 6,490,996 B1
(45) Date of Patent: Dec. 10, 2002

(54) CAT SCRATCH POST WITH CLAW TRIMMING DEVICE

(76) Inventor: Orin O. Terry, P.O. Box 1990, Eureka, MT (US) 59917

( * ) Notice: Subject to any disclaimer, the term of this patent is extended or adjusted under 35 U.S.C. 154(b) by 33 days.

(21) Appl. No.: 09/698,361

(22) Filed: Oct. 27, 2000

(51) Int. Cl.⁷ .............................................. A01K 15/02
(52) U.S. Cl. ..................................................... 119/706
(58) Field of Search ................................ 119/706, 707, 119/709, 710, 702, 708, 621, 600

(56) References Cited

U.S. PATENT DOCUMENTS

| 205,088 A | 6/1878 | Hollman |
| 490,377 A | 1/1893 | Trebbin |
| 1,163,455 A | 12/1915 | Randolph |
| 1,526,986 A | 2/1925 | Janz |
| 2,005,817 A | 6/1935 | Yoder ............................ 119/1 |
| 2,467,589 A | 4/1949 | Johansson ...................... 30/29 |
| 2,997,019 A | 8/1961 | Bryson .......................... 119/1 |
| 3,845,553 A | 11/1974 | Fields ............................ 30/29 |
| 4,253,423 A | 3/1981 | Kaplan ......................... 119/29 |
| 4,802,444 A | * 2/1989 | Markham et al. ............. 119/29 |
| RE34,352 E | * 8/1993 | Markham et al. ........... 119/710 |
| 5,564,365 A | 10/1996 | Kacic ........................... 119/165 |
| 5,666,907 A | 9/1997 | Kacic ........................... 119/706 |
| D386,839 S | 11/1997 | Jennus ....................... D30/160 |
| 5,730,084 A | 3/1998 | Kacic ........................... 119/165 |

* cited by examiner

Primary Examiner—Charles T. Jordan
Assistant Examiner—Bethany L Griles
(74) Attorney, Agent, or Firm—Price, Heneveld, Cooper, DeWitt & Litton

(57) ABSTRACT

A trimmer device for animals and the like, particularly cats, comprises an outer enclosure, preferably including a back as well as a front cover member, with a fixed internal blade. The front cover member has a plurality of slots to receive the extended claws of animals, to trim them as the claws are raked over the device or the latter is moved with respect to the claws. The slots affording access to the cutting edge of the internal blade may be made with varying width and length configurations to accommodate various animals, and the internal blade may be made adjustable and/or replaceable. Preferably, the novel cutting device is used in combination with a scratching post or the like, and mounted directly on the latter so as to be automatically engaged by the claws of animals using the scratching post in the normal manner.

16 Claims, 2 Drawing Sheets

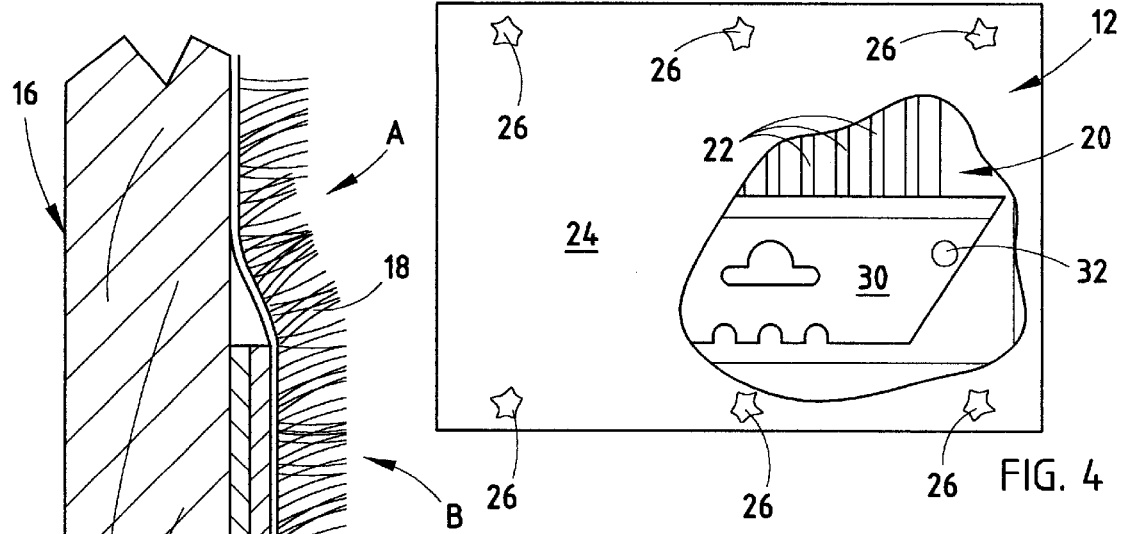
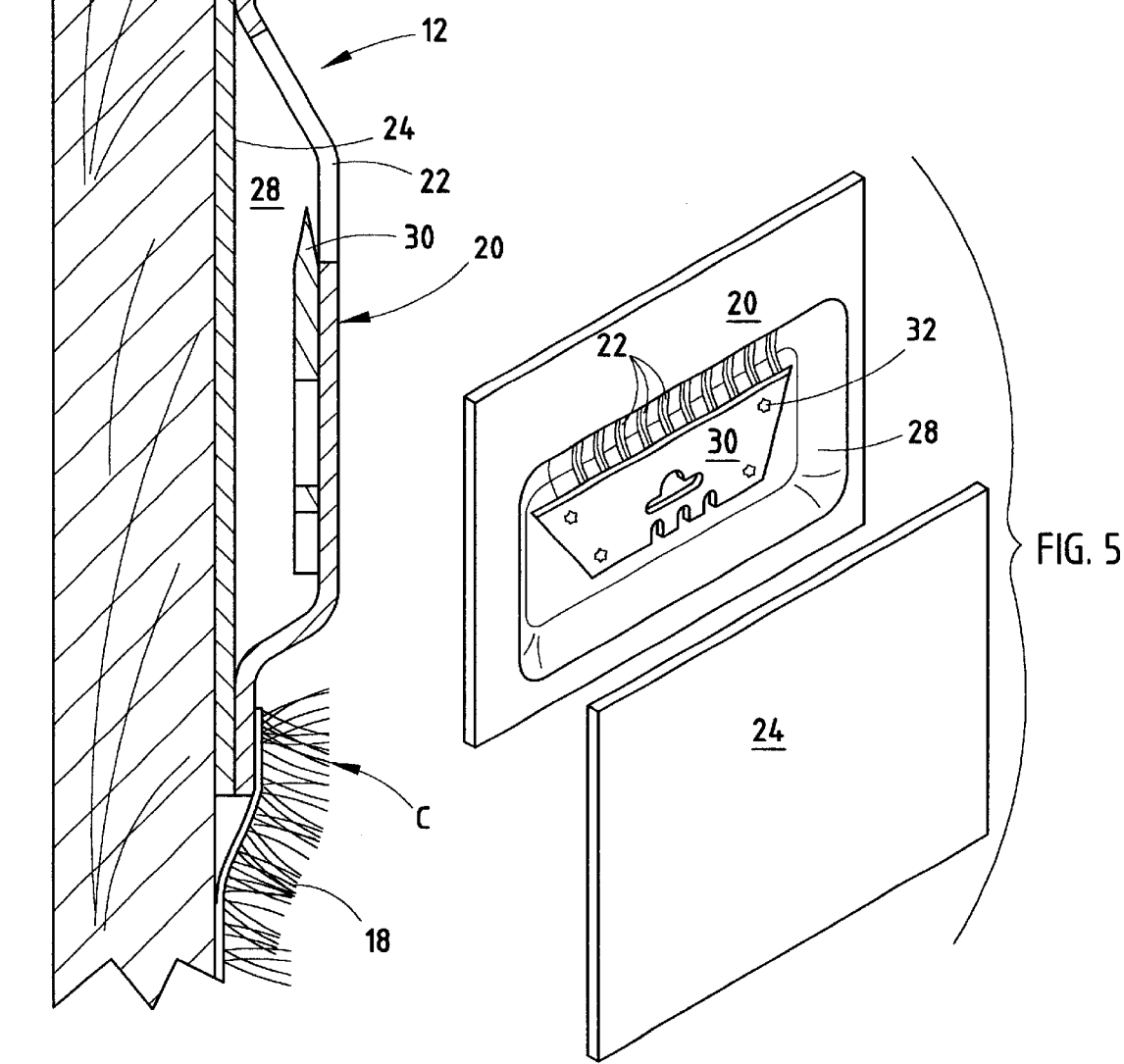

CAT SCRATCH POST WITH CLAW TRIMMING DEVICE

FIELD OF THE INVENTION

This invention relates to pet animal maintenance and care equipment and apparatus, and more particularly to combined activated exercise and hygienic or physical care equipment for pets, particularly feline pets. Still more particularly, the invention relates to a combined cat activity or exercise device (e.g., scratching post) and claw-trimmer.

BACKGROUND OF THE INVENTION

Numerous devices have been proposed and offered in the past for providing entertainment or activities for pets and for exercising them, providing various appearance care, etc., and some such devices have attempted various combinations of these characteristics. For example, in previous U.S. Pat. Nos. 5,666,907 and 5,730,084, a device for cats was proposed which provided an abrasive at the bottom of a cat litter pan, on the assumption that the animal's natural scratching tendencies in using a litter pan would thus automatically work to smooth and shorten or at least dull its claws. A small number of other similar such efforts have also been proposed in the past, as shown, for example in U.S. Pat. No. 2,997,019, wherein an abrasive sheet is attached to a scratching post; however, it seems clear that such devices would have a minimal effect at best and would not actually shorten the claws very much, or take the place of trimming, if indeed actually operative for either intended purpose at all.

Nonetheless, the need for an effective such device continues unabated, and to an ever-increasing degree as the pet population steadily increases.

BRIEF DESCRIPTION OF THE INVENTION

The present invention provides a unique and effective solution for the above problem in the area of pet felines, particularly house cats, by providing a novel and unobvious claw-trimming device and in addition providing a unique way of utilizing such a device by mounting it upon an exercise apparatus, e.g., a cat scratching post, which cats naturally tend to use.

As a result, the invention provides a highly novel and unique combination apparatus which the animals naturally tend to use, enjoy, and which automatically trims their claws to a desired length. Further, in the broader aspects of the invention the novel trimming device can be used in other ways for achieving the same basic result, and its cutting member may be made variable or adjustable in nature so that the length of the resulting trimmed claw conforms to a predetermined size.

The foregoing major attributes and advantages of the invention will be better understood and appreciated after considering the following specification and drawings disclosing a preferred embodiment thereof.

BRIEF DESCRIPTION OF THE DRAWINGS

In the drawings:

FIG. 3 is a further enlarged, fragmentary, side elevational cross section of the device shown in FIG. 1, as taken along the plane 111-111 thereof;

FIG 4 is a fragmentary rear elevational view of the trimmer device alone, partially broken away to show internal components thereof; and FIG. 5 is an exploded view showing the structure of FIG. 4 with the back panel removed to better show internal components.

DESCRIPTION OF THE PREFERRED EMBODIMENTS

Figure 1:
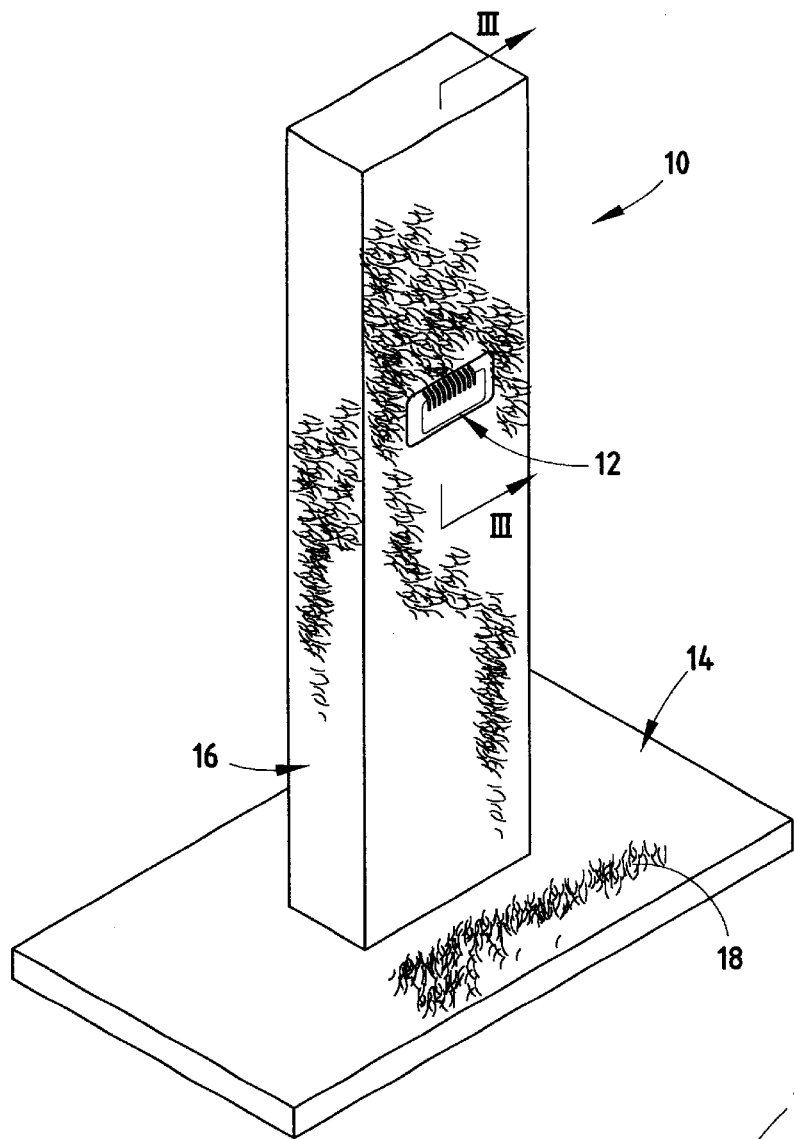
FIG. 1 is a front perspective view of a cat scratching post having the novel claw-trimmer device mounted in place thereupon.

The representation of the scratching post device 10 shown in FIG. 1 is intended to be strictly for illustrative purposes, and it includes a support/base 14 which enables the device to stand upright by itself, together with the scratching post portion 16, which in this example simply comprises a vertically oriented rectangular member. As with most such devices, the apparatus 10 is shown (by way of partial representation) covered with a thick, long-nap fabric 18 such as carpet, which cats naturally like to rake their claws through.

Figure 2:
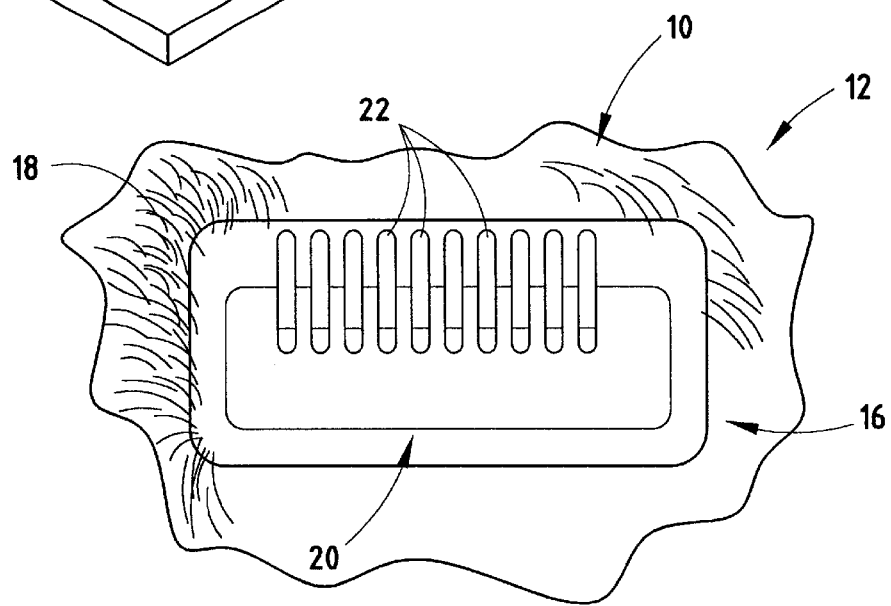
FIG. 2 is a enlarged, fragmentary front view showing the area of the scratching post which carries the claw-trimmer.

As shown in FIGS. 2 and 3, the trimmer apparatus 12, in the particular embodiment illustrated, comprises a relatively thin, generally rectangular assembly which in this example extends length-wise across at least an appreciable portion of the upright post 16, on which it is mounted in a manner such that the fabric or carpet 18 extends at least slightly over the edges of the trimmer apparatus 12.

As illustrated in FIGS. 2 and 3, and as further illustrated in FIGS. 4 and 5, the trimmer apparatus 12 in this preferred embodiment includes a front face plate 20 having a plurality of vertically oriented slots 22 extending through it, together with a rear closure plate 24 which may be either permanently or removably attached to the face plate 20 (spot-welds 26 being shown in FIG. 4 for illustrative purposes).

In the preferred embodiment illustrated, the face plate 20 is outwardly dished (i.e., convex) over its center portion, so as to provide a hollow interior area 28 (FIG. 3). Within the hollow interior area 28, a trimmer blade 30 is mounted in a predetermined location in a secure manner, either by a permanent connection such as by use of rivets 32 (FIG. 4), or spot welds, or by other mechanical fasteners (which may be releasable in nature). As will be recognized from the preferred embodiment shown, blade 30 is of a type conventionally used in utility knives, and is generally similar to a razor blade in nature.

As best shown in FIG. 3, the convex, outwardly-dished configuration of face plate 20 allows the slots 22 to be located along the upper portion of the face plate, where it extends outwardly away from the rear closure plate 24 and from the post 16 upon which the latter is mounted. This configuration not only allows a space for mounting the blade 30 inside area 28 but positions the slots 22 on an outwardly-extending "knee" portion of the face plate, which contributes significantly to what is regarded as the best operational configuration for the device. That is, when a cat commences scratching on post 16 at its upper extremity (represented generally by the character "A" in FIG. 3), it will continue its downward scratching motion directly over the top of the novel trimmer device 12. This brings the outwardly-extended claws of the animal into engagement with the vertically-oriented slots 22, which are thus aligned longitudinally with the natural scratching path or motion of the claws. the claims:

Thus, the animal engages its claws directly with the trimmer device 12 without realizing it. That is, the animal's claws enter the various slots 22 in a manner such that the extended ends of the claws pass through space 28 and naturally engage the sharp upper edge of blade 30. Since cats naturally apply substantial force to their scratching action, blade 30 will neatly trim the claws with little or no notice by the cat. The amount or length trimmed will be that which extends inside trimmer device 12, but the remainder of the claw (including the tender cuticle portion thereof will remain intact and unaffected.

Thus, the trimming action provided by the device is automatic in nature, corresponding directly with the natural activities of the animal, and it is entirely harmless insofar as any discomfort is concerned. In fact, it is believed that the engagement of the extended claw tips with the top of blade 30 provides a slight added resistance which the animals actually enjoy, which prompts the exertion of additional force. that not only helps trim the claws effectively but also helps satisfy the scratching urges of the animal.

It is to be pointed out that the particular position of blade 30 inside space 28 may readily be made adjustable by attaching blade 30 to face plate 22 through the use of releasable mechanical fasteners and providing various positions of relative adjustment, e.g., vertical slots in blade 30 by which the blade may be moved up or down relative to the mechanical fasteners (which in this case could for example be small machine screws extending into space 28 from either the face plate 20 or the rear closure plate 24, passing through a hole or slot in the blade located at the position designated by the numeral 30). In this manner, either more or less claw may be removed during the scratching exercise, to better accommodate a particular animal or condition.

It should also be pointed out that the attachment of trimmer device 12 to post 16 may be carried out in various ways, so as to make the trimmer device either adjustable, replaceable, or permanently attached to post 16. For example, adhesive may simply be applied between the rear surface of plate 24 and the adjacent surface of post 16 or, alternatively, releasable mechanical fasteners such as screws or the like may be used to make the trimmer device replaceable. If the event trimmer device is to be attached in a removable fashion, the edge portions "B" and "C" of the fabric of cloth 18 which cover the perimeter of the trimmer 12 may be left unsecured (i.e., as a flap) so that the trimmer 12 may be inserted behind the overhanging edges of fabric/cloth 18. Alternatively, releasable adhesive may be employed between the fabric and the edges of the trimmer device to maintain portions B and C in their general desired location.

As a final matter, it should also be pointed out that the slots 22 may be given a variety of different lengths and widths, as well as mutual lateral spacings, so as to accommodate the claws of various different types of cats, or other animals. Furthermore, in the broader aspects of the invention, the trimmer device 12 may even be used by itself, apart from any other device 10, or mounted on other types of activity or exercise devices, etc., in order to accommodate particular types and species of animals (cats or felines not being the only possible such animal with respect to which the novel device is usable).

The above description is considered that of the preferred embodiments only. Modifications and variations of this and other such embodiments may well occur to those skilled in the art and to those who make or use the invention after learning of it through access to such preferred embodiments. Accordingly, it is to be understood that the embodiment shown in the drawings and described above is merely for illustrative purposes and should not be used to limit the scope of the invention, which is defined by the following claims as interpreted according to the principles of patent law, including the doctrine of equivalents.

The invention claimed is:

1. A multi-functional pet animal care device, comprising in combination: an animal exercise apparatus adapted for use by a pet animal to physically exercise at least portions of the animal, and a hygienic care device mounted in association with said exercise apparatus in a position and location wherein it will operably be contacted by a pet animal using said exercise apparatus, such that said animal receives hygienic care and physical exercise during the same interval; said hygienic care device comprising a trimmer having a cutting blade.

2. A pet animal care device as recited in claim 1, wherein said trimmer comprises an animal claw trimmer and said blade is shaped and located to trim animal claws by cutting off their end portions.

3. A pet animal care device as recited in claim 2, wherein said animal exercise apparatus comprises a scratching device for exercising animal claws.

4. A pet animal care device as recited in claim 3, wherein said claw trimmer is adapted to receive the extended claws of an animal using said scratching device and said blade is adapted to trim the end portions of said received claws.

5. A pet animal care device as recited in claim 4, wherein said trimmer has a face plate which at least partially overlies a side of said blade.

6. A pet animal care device as recited in claim 5, wherein said face plate includes a plurality of slots which are sized and shaped to receive an extended animal claw.

7. A pet animal care device as recited in claim 6, wherein said blade is disposed adjacent said face plate and has a cutting edge which intersects and lies across at least portions of some of said slots.

8. A pet animal care device as recited in claim 7, wherein said blade is adjustably mounted with respect to said face plate.

9. A pet animal care device as recited in claim 3, wherein said trimmer is mounted upon said scratching device.

10. A pet animal care device as recited in claim 9, wherein said scratching device includes a post having an outer cover of heavy-nap material.

11. In combination, a cat scratching device having a surface covered with a material which is readily penetrable by the claws of a cat scratching the device and a claw trimmer mounted upon said scratching device having a cutting device in a position underlying at least some of said penetrable material to be contacted by the claws of the cat upon penetration of the cat's claws into the material.

12. A pet animal care device as recited in claim 11, wherein said claw trimmer includes a sharp cutting blade.

13. A pet animal care device as recited in claim 12, wherein said claw trimmer includes a face plate generally overlying at least portions of said cutting blade.

14. A pet animal care device as recited in claim 13, wherein said face plate is slotted to receive the extended claws of a cat using said scratching post.

15. A multi-functional pet animal care device, comprising in combination: an animal exercise apparatus adapted for use by a pet animal to physically exercise at least portions of the animal, and a hygienic care device mounted in association with said exercise apparatus in a position and location wherein it will operably be contacted by a pet animal using said exercise apparatus, such that said animal receives hygienic care and physical exercise during the same interval; said animal exercise apparatus comprising a cat scratching post and said hygienic care device comprising a claw trimming device having a cutting device mounted on said scratching post.

16. A pet animal care device as recited in claim 15, wherein said hygienic care device comprises a trimmer having a cutting blade.

* * * * *